(12) United States Patent
Mizutani

(10) Patent No.: US 8,901,792 B2
(45) Date of Patent: Dec. 2, 2014

(54) MOTOR

(75) Inventor: Nobuo Mizutani, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 393 days.

(21) Appl. No.: 13/353,788

(22) Filed: Jan. 19, 2012

(65) Prior Publication Data

US 2012/0194020 A1    Aug. 2, 2012

(30) Foreign Application Priority Data

Jan. 31, 2011  (JP) .................................. 2011-017855
Nov. 14, 2011  (JP) .................................. 2011-248984

(51) Int. Cl.
*H02K 9/00* (2006.01)
*H02K 5/14* (2006.01)

(52) U.S. Cl.
CPC ..................................... *H02K 5/148* (2013.01)
USPC .............................................. 310/83; 310/239

(58) Field of Classification Search
USPC ..................................... 310/83, 238, 239, 71
See application file for complete search history.

(56) References Cited

U.S. PATENT DOCUMENTS

| | | | | |
|---|---|---|---|---|
| 2,729,758 A * | 1/1956 | Knapp | ............................ | 310/59 |
| 4,142,120 A * | 2/1979 | Hallerback | ..................... | 310/59 |
| 5,401,145 A * | 3/1995 | Bleger et al. | .................. | 417/369 |
| 6,400,048 B1* | 6/2002 | Nishimura et al. | ............. | 310/47 |
| 6,452,297 B2* | 9/2002 | Yamamoto et al. | ............. | 310/89 |
| 6,922,003 B2* | 7/2005 | Uchida | ......................... | 310/239 |
| 8,049,380 B2* | 11/2011 | Li et al. | ........................... | 310/62 |

FOREIGN PATENT DOCUMENTS

JP    2003-018794    1/2003

* cited by examiner

*Primary Examiner* — Dang Le
(74) *Attorney, Agent, or Firm* — Fish & Richardson P.C.

(57) ABSTRACT

A brush holder is provided in a metal yoke. The brush holder holds feeder brushes for supplying power to a commutator. The commutator and the feeder brushes are arranged outside the yoke housing as seen in a direction orthogonal to the axis of the yoke. As seen in the axial direction, proximal ends of the feeder brushes are arranged outside the inner circumferential surface of the yoke.

6 Claims, 7 Drawing Sheets

MOTOR

BACKGROUND OF THE INVENTION

The present invention relates to a motor.

The motor described in Japanese Laid-Open Patent Publication No. 2003-18794 is formed of a yoke housing, a motor portion, and a speed reducing portion. The motor portion is provided with a rotor having a rotary shaft in the yoke housing. The speed reducing portion is provided at an end portion on the output side of the motor portion. The speed reducing portion reduces the speed of rotation generated in the motor portion. The rotary shaft of a rotor projects from an open end on the output side of the yoke housing toward the speed reducing portion. A brush holder, which holds feeder brushes, is provided at the open end of the yoke housing. The brush holder supplies power to a commutator of the rotor. According to the configuration in Japanese Laid-Open Patent Publication No. 2003-18794, the commutator and the feeder brushes are arranged inside the yoke housing. The distal ends of the feeder brushes are in contact with a plurality of segments provided on the outer circumferential surface of the commutator. As a result, the feeder brushes and the commutator are electrically conducted with each other. The speed reducing portion has a gear housing, which accommodates a worm gear and a worm wheel. The gear housing is fixed by a screw to the end portion on the output side of the yoke housing. The speed of rotation generated in the motor portion is reduced by the worm gear and the worm wheel, and the rotation of reduced speed is outputted.

For higher output, increase in the number of poles in the motor has been promoted. In this case, the outer diameter of the commutator needs to be enlarged so as to ensure a sufficient dimension in the circumferential direction of each segment. However, the commutator and the feeder brush are arranged inside the yoke housing in the motor described in Japanese Laid-Open Patent Publication No. 2003-18794. Thus, if the outer diameter of the commutator is increased, the yoke housing needs to be formed into the shape that can contain the feeder brushes or the dimension of the feeder brushes in the radial direction needs to be reduced. However, the yoke housing is made of a metal member in general. Thus, in the case of the invention described in Japanese Laid-Open Patent Publication No. 2003-18794, if the yoke housing is formed in the stepped shape in order to make it capable of accommodating the feeder brushes, the number of manufacturing processes is increased. Also, the feeder brushes is abraded by sliding contact with the commutator and gradually becomes shorter. Thus, if the dimension of the feeder brush is made shorter, the life of the motor is also made shorter.

SUMMARY OF THE INVENTION

An objective of the present invention is to provide a motor that has an easy-to-manufacture yoke housing and achieves high output without reducing the dimension of the feeder brushes in the radial direction.

To achieve the foregoing objective and in accordance with a first aspect of the present invention, a motor including a motor portion and a speed reducing portion is provided. The motor portion includes a brush holder, which holds a feeder brush for supplying power to a commutator fixed to a rotary shaft. The brush holder is provided at an open end of a metal yoke housing, through which open end rotation of the motor portion is outputted. A gear housing is assembled to the open end of the yoke housing. The speed reducing portion has a speed reducing mechanism located in the gear housing. The speed reducing mechanism reduces the speed of the rotation from the motor portion and outputting the rotation. As seen in a direction orthogonal to an axis of the yoke housing, the commutator and the feeder brush are arranged outside the yoke housing. As seen in the axial direction, an outer end of the feeder brush is arranged outside an inner circumferential surface of the yoke housing.

In accordance with a second aspect of the present invention, a motor including a motor portion and a speed reducing portion is provided. The motor portion includes a brush holder, which holds a feeder brush for supplying power to a commutator fixed to a rotary shaft. The brush holder is provided at an open end of a metal yoke housing, through which open end rotation of the motor portion is outputted. A gear housing is assembled to the open end of the yoke housing. The speed reducing portion has a speed reducing mechanism located in the gear housing. The speed reducing mechanism reduces the speed of the rotation from the motor portion and outputting the rotation. The brush holder has a brush accommodating portion, which accommodates the feeder brush such that the feeder brush is movable. As seen in a direction orthogonal to an axis of the yoke housing, the commutator, the brush accommodating portion, and the feeder brush are arranged outside the yoke housing. As seen in the axial direction, an outer end of the brush accommodating portion is arranged outside an inner circumferential surface of the yoke housing.

In accordance with a third aspect of the present invention, a motor including a motor portion and a speed reducing portion is provided. The motor portion includes a brush holder, which holds a feeder brush for supplying power to a commutator fixed to a rotary shaft. The brush holder is provided at an open end of a metal yoke housing, through which open end rotation of the motor portion is outputted. A gear housing is assembled to the open end of the yoke housing. The speed reducing portion has a speed reducing mechanism located in the gear housing. The speed reducing mechanism reduces the speed of the rotation from the motor portion and outputting the rotation. The brush holder has a brush box, in which a brush accommodating portion is formed. The brush accommodating portion accommodates the feeder brush such that the feeder brush is movable. As seen in a direction orthogonal to an axis of the yoke housing, the commutator, the brush box, and the feeder brush are arranged outside the yoke housing. As seen in the axial direction, an outer end of the brush box is arranged outside an inner circumferential surface of the yoke housing.

DETAILED DESCRIPTION OF THE PREFERRED EMBODIMENTS

Figure 5:
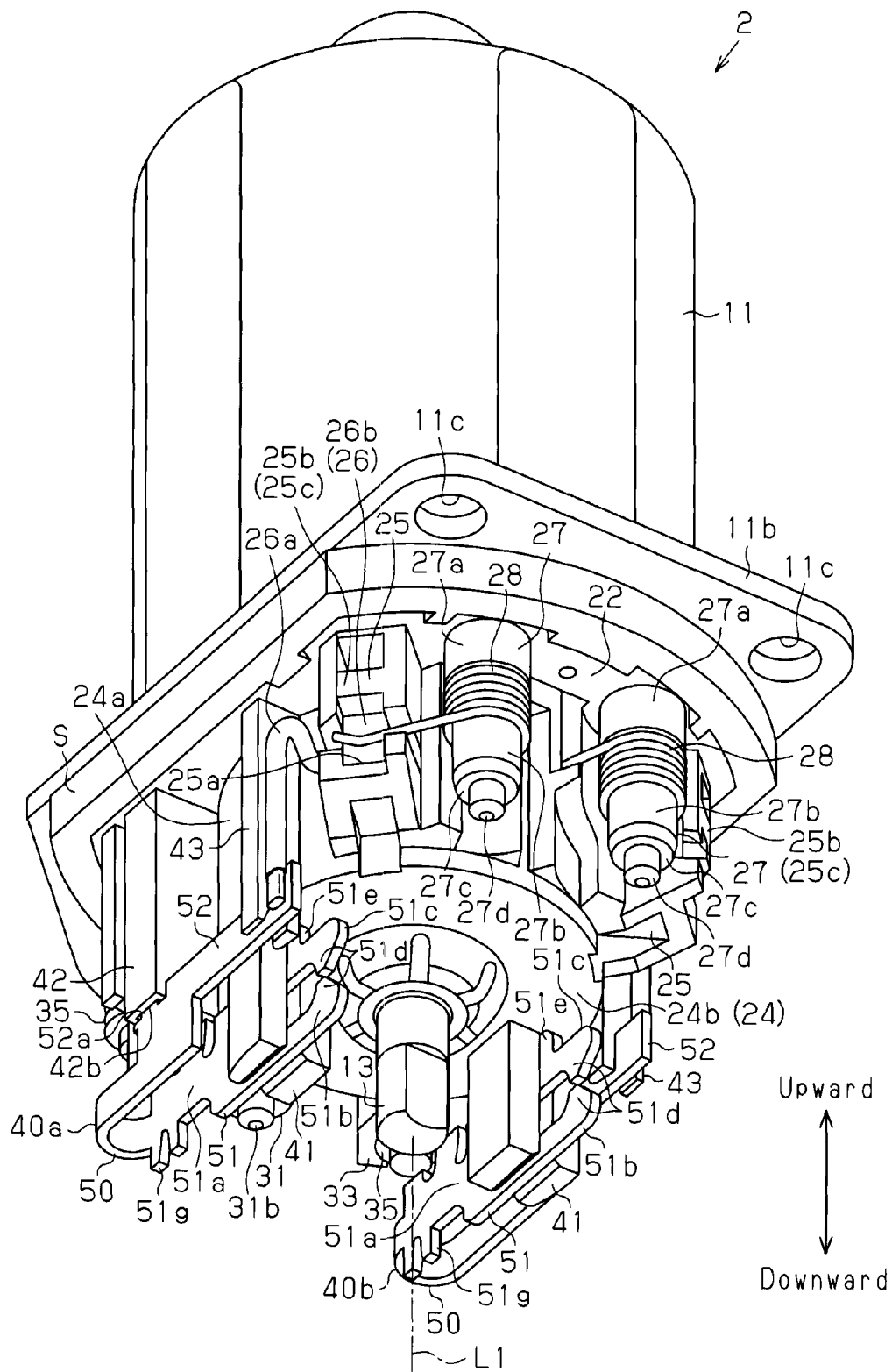
FIG. 5 is a perspective view as seen from below a motor portion.
Figure 6:
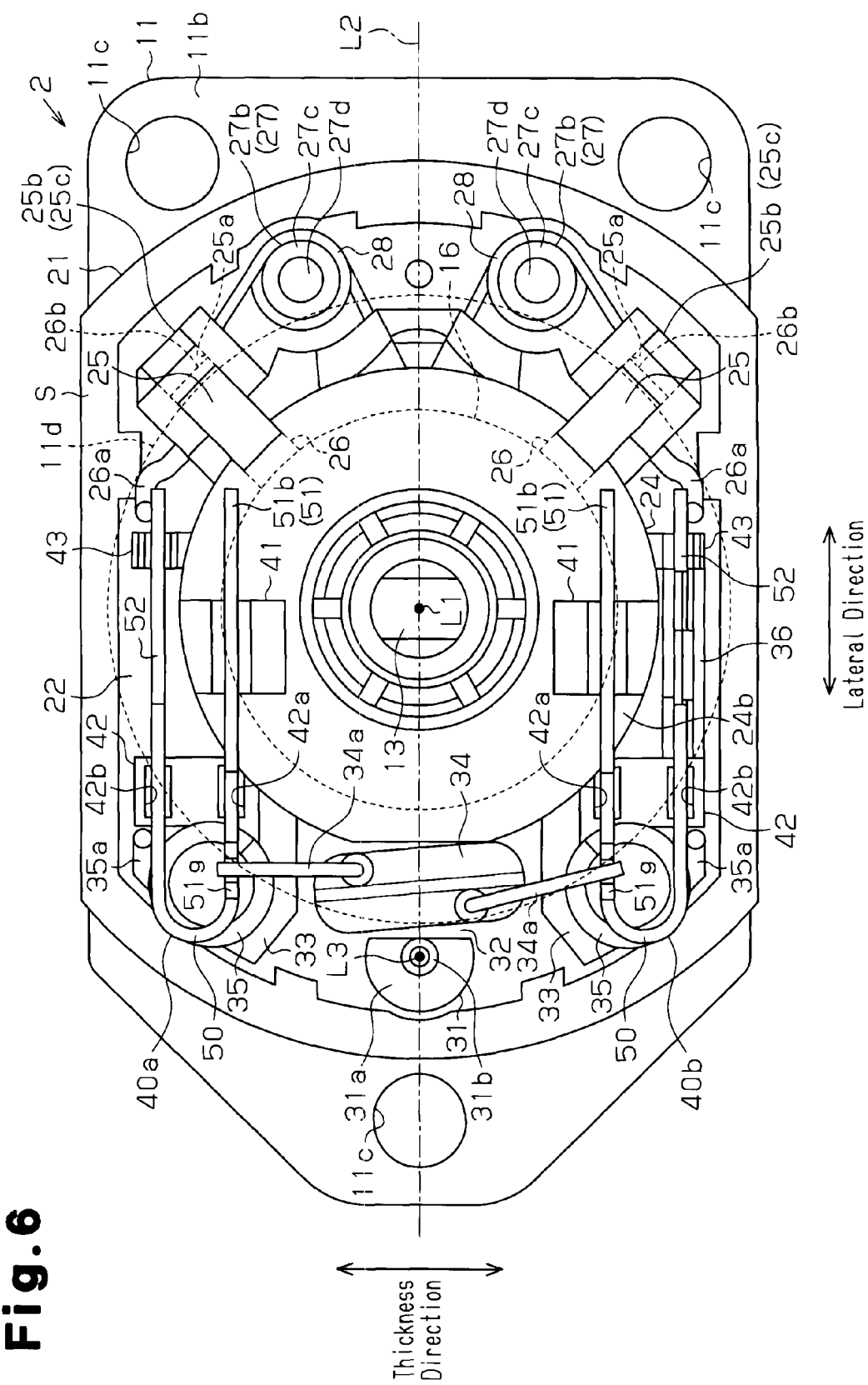
FIG. 6 is a plan view of the motor portion as seen from below.
Figure 7:
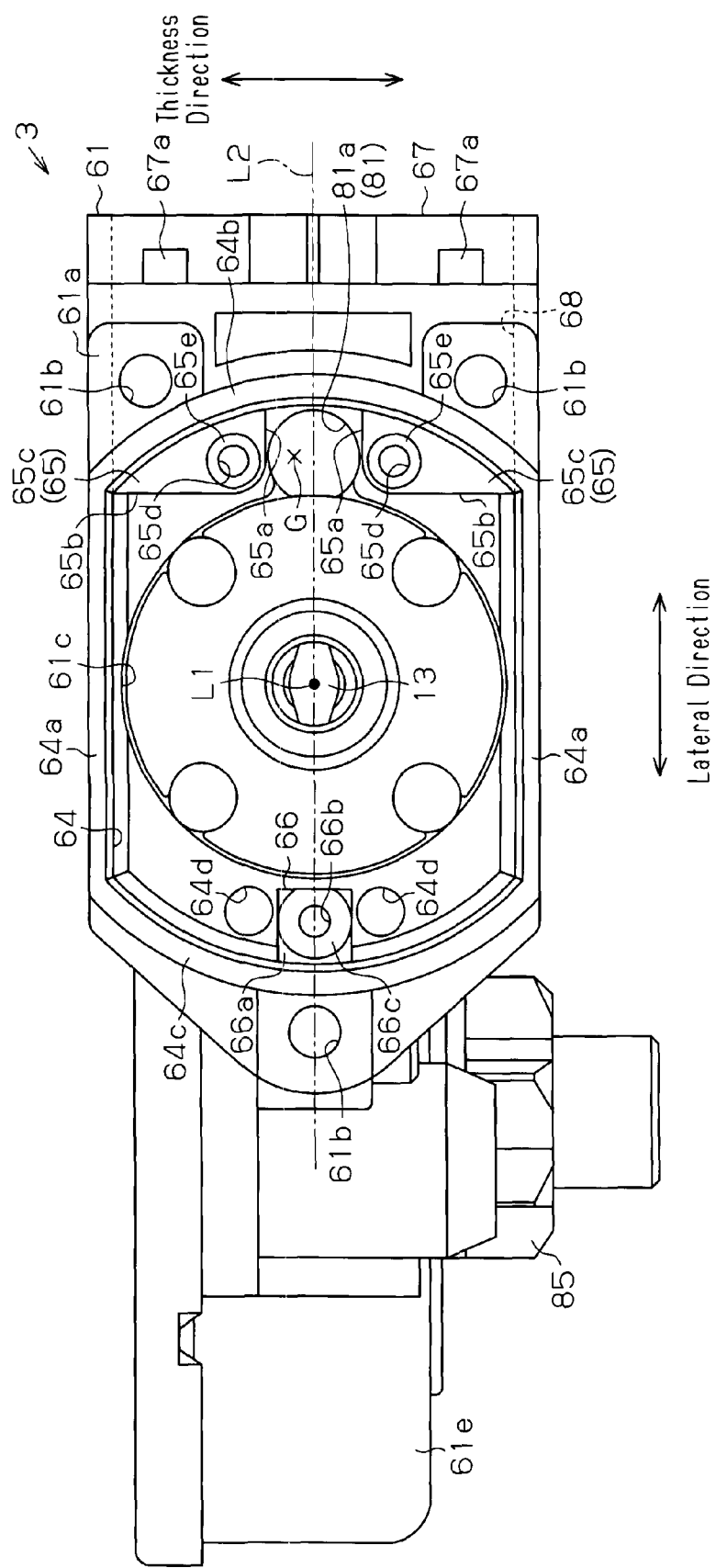
FIG. 7 is a plan view of a gear housing as seen from above.

One embodiment in which a motor 1 of the present invention is embodied as a drive source for a power window device which raises and lowers a window glass of a vehicle will be described below by referring to FIGS. 1 to 7. In the explanation of the motor of the present invention, upward, downward, lateral, and thickness directions are defined as indicated in FIGS. 5 to 7, and described below.

Figure 1:
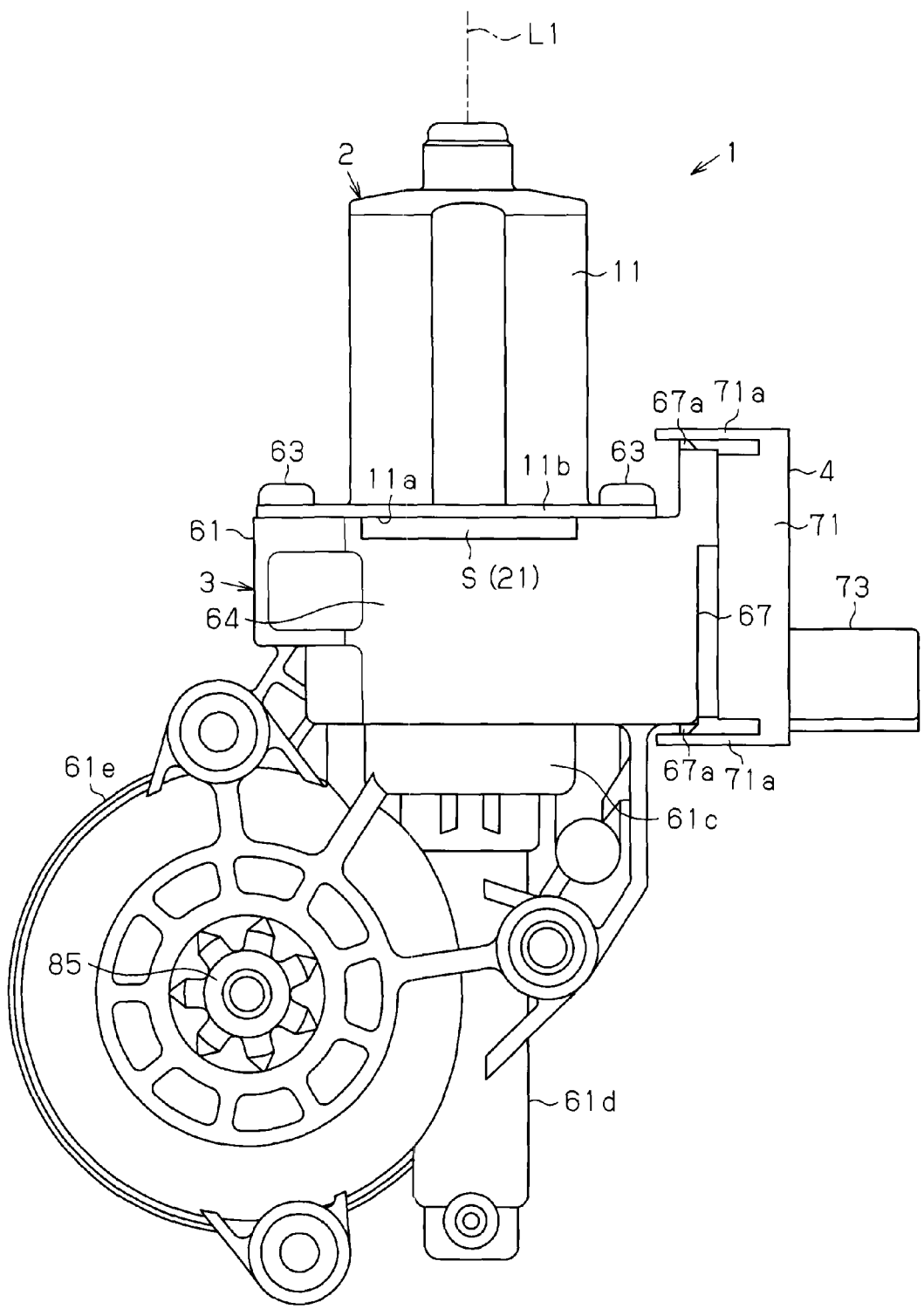
FIG. 1 is a side view of a motor according to one embodiment of the present invention.

As illustrated in FIG. 1, the motor 1 is provided with a motor portion 2, a speed reducing portion 3 provided below the motor portion 2, and a connector portion 4 assembled to the side of the speed reducing portion 3. The motor 1 has a flattened shape in the thickness direction, which is orthogonal to an axis L1.

[Configuration of Motor Portion]

Figure 2:
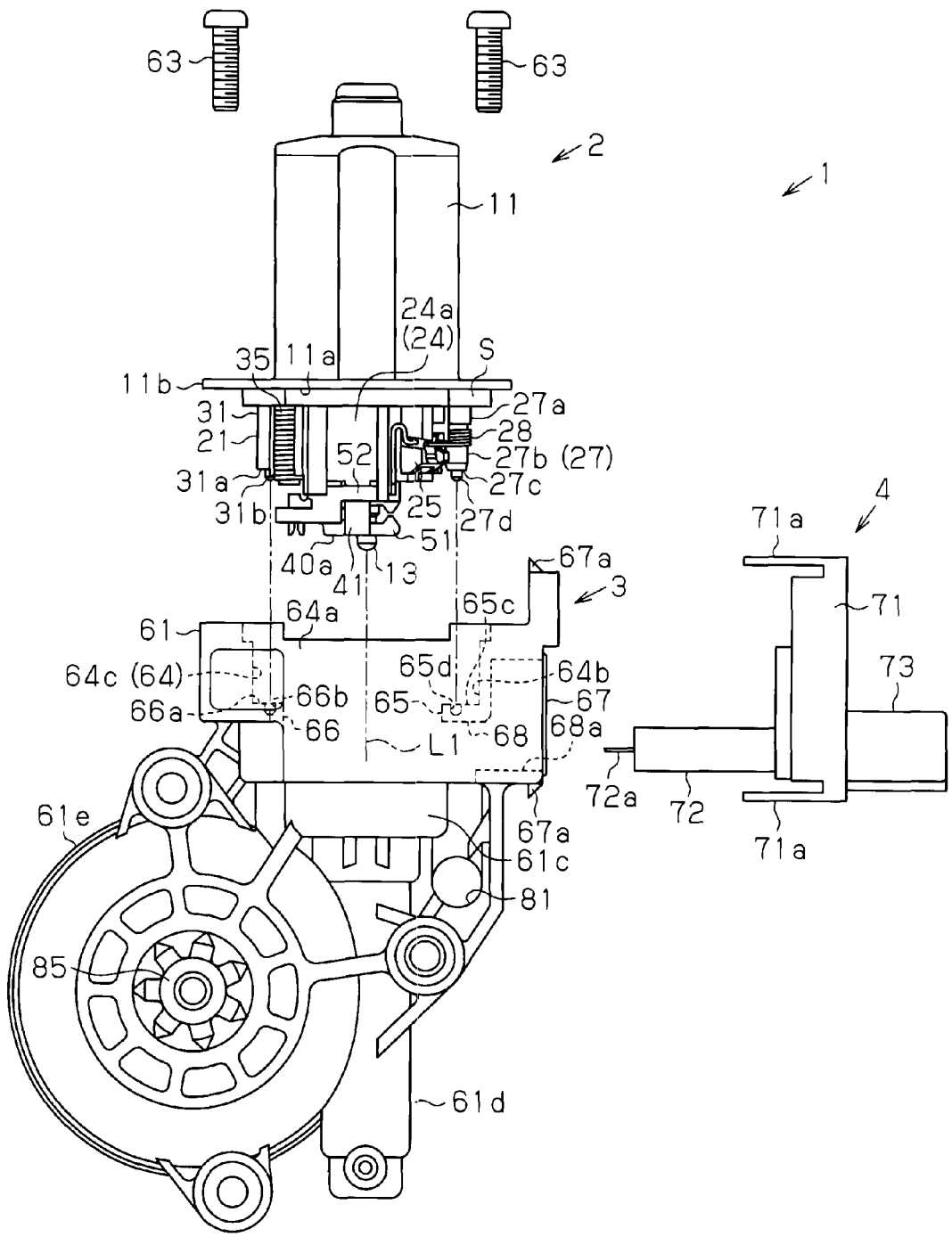
FIG. 2 is an exploded side view of the motor.
Figure 3:
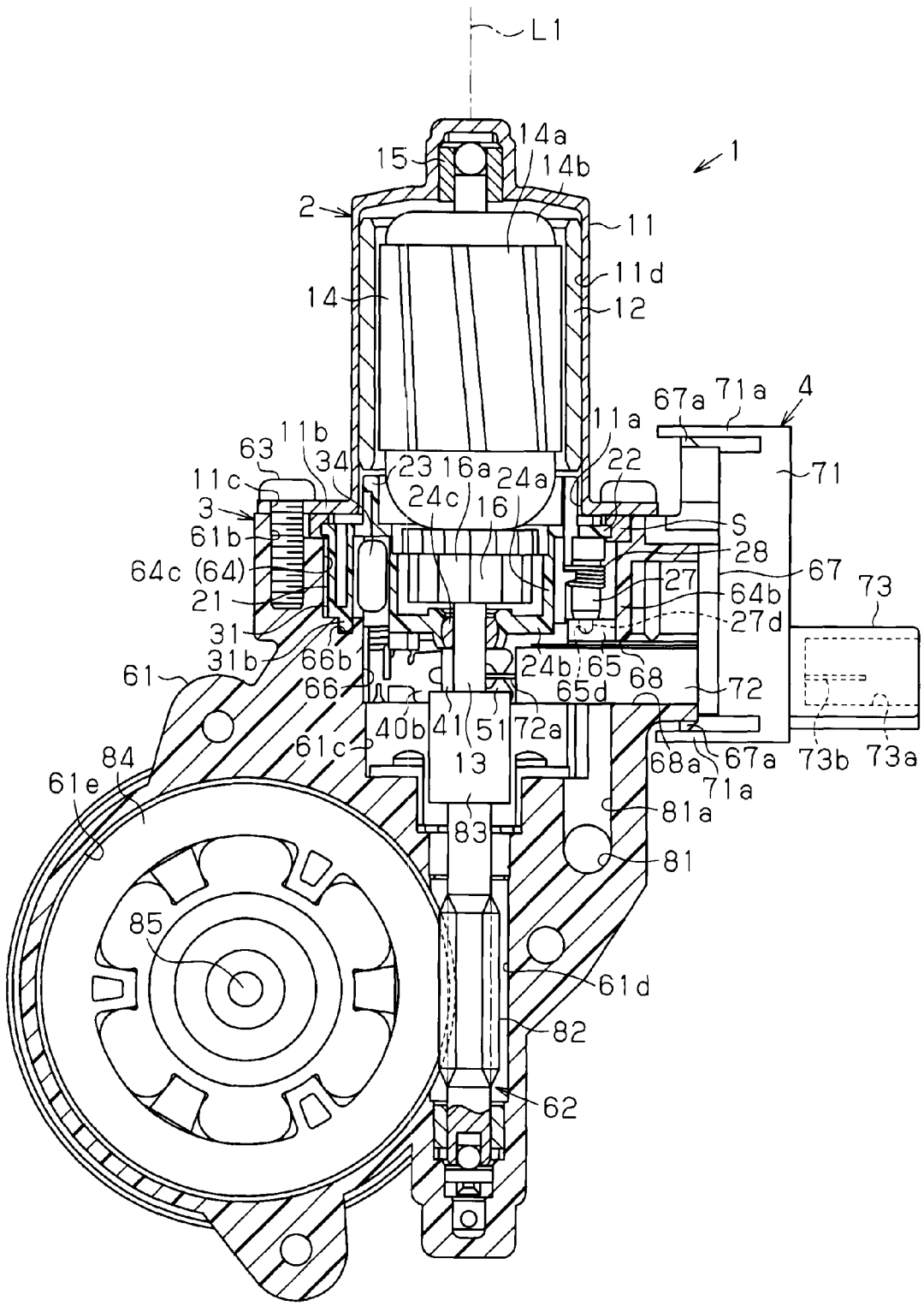
FIG. 3 is a cross-sectional view of the motor.

As illustrated in FIGS. 1, 2, and 3, the motor portion 2 is provided with a yoke housing 11 (hereinafter referred to simply as a yoke 11). The yoke 11 is formed cylindrically with the upper end closed. An open end 11a is provided in the lower end of the yoke 11. A flange portion 11b extending outward in the radial direction is formed on the open end 11a. As illustrated in FIG. 6, an inner circumferential surface 11d of the yoke 11 extends along a circle around the axis L1 of the motor portion 2.

As illustrated in FIG. 3, a magnet 12 is fixed to the inner circumferential surface 11d of the yoke 11. An armature 14 is arranged inside the magnet 12. The armature 14 has a columnar rotary shaft 13. The rotary shaft 13 is arranged at the center of the yoke 11. A bearing 15 is provided at the center on the bottom part of the yoke 11. The upper end of the rotary shaft 13 is supported by the bearing 15 rotatably with respect to the yoke 11. The armature 14 rotates with the rotary shaft 13 around the axis L1 of the rotary shaft 13. The distal end of the rotary shaft 13 projects downwards from the open end 11a of the yoke 11. A commutator 16 is fixed to the projecting portion of the rotary shaft 13. The commutator 16 is arranged outside the yoke 11. The speed reducing portion 3 is provided with a gear housing 61 made of a resin. The distal ends of the commutator 16 and the rotary shaft 13 are arranged inside the gear housing 61.

An armature core 14a is fixed to the rotary shaft 13. The armature 14 is formed by winding a coil 14b around teeth of the armature core 14a. A plurality of segments 16a are fixed on the outer circumferential surface of the commutator 16. Each of the segments 16a is arranged with an equal interval in the circumferential direction of the commutator 16 and is insulated from each other. A terminal line of the corresponding coil 14b is connected to each of the plurality of segments 16a.

[Configuration of Brush Holder]

Figure 4:
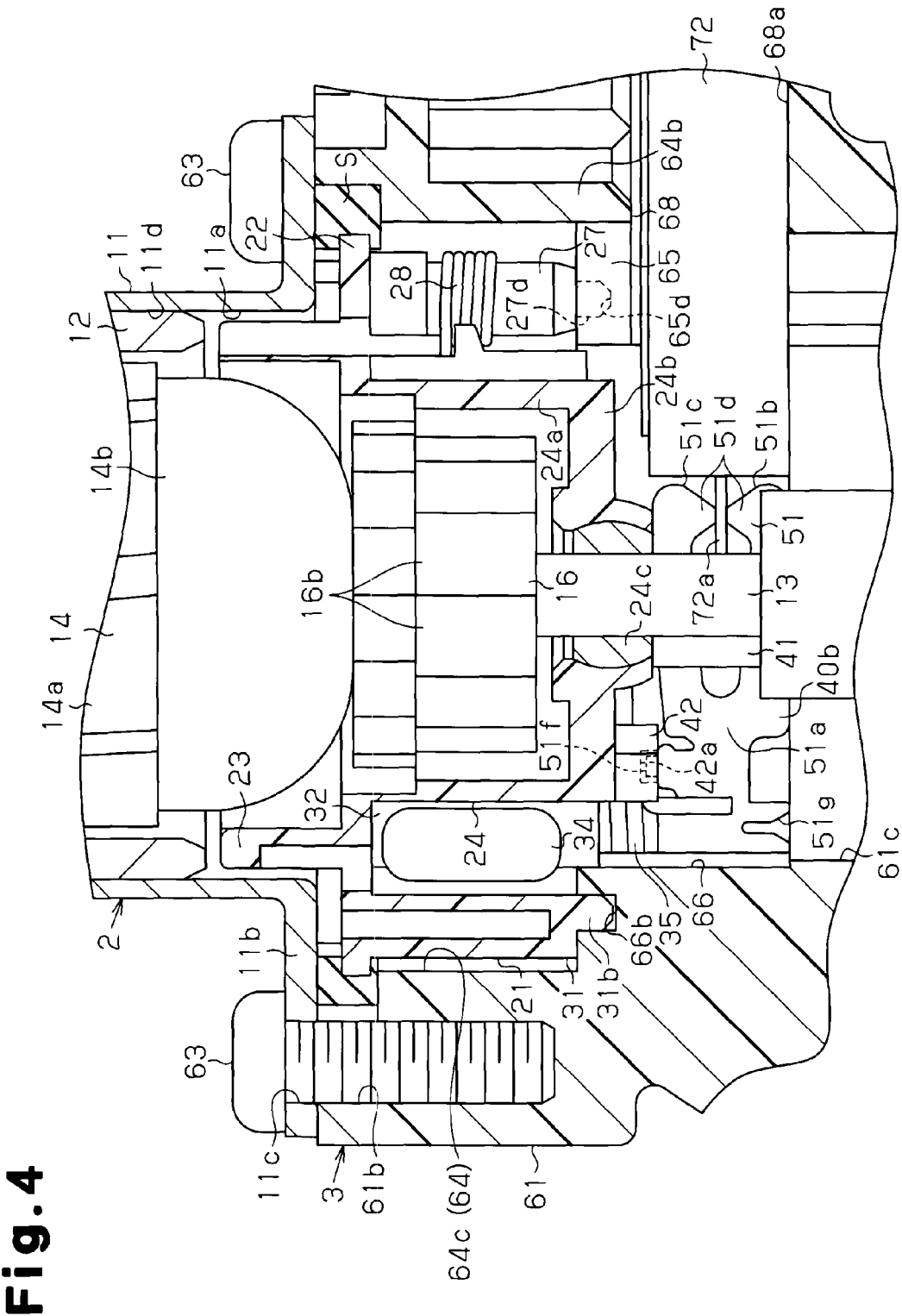
FIG. 4 is a partial cross-sectional view illustrating the vicinity of a brush holder in FIG. 3 in an enlarged manner.

As illustrated in FIGS. 3 and 4, a brush holder 21 is provided at the open end 11a of the yoke 11. The brush holder 21 has a plate-shaped proximal portion 22 arranged on the lower side of the open end 11a of the yoke 11. The dimension in a direction orthogonal to the axis of the proximal portion 22 is set slightly larger than that of the open end 11a of the yoke 11. A fixed wall portion 23 is formed on the proximal portion 22. The fixed wall portion 23 extends in the axial direction along the inner circumferential surface 11d of the yoke 11. The fixed wall portion 23 is inserted into the yoke 11 through the open end 11a and fixed thereto. A sealing member S made of elastomer is provided on an outer peripheral portion of the proximal portion 22. The sealing member S is formed to have a U-shaped cross-section so as to hold the outer peripheral portion of the proximal portion 22. The sealing member S is held between a flange portion 11b and the gear housing 61. As a result, the sealing member S seals a gap between the open end 11a of the yoke 11 and an opening of the gear housing 61 faced with the yoke 11. Thus, entry of liquid into the yoke 11 and the gear housing 61 is prevented.

A cover portion 24 extending downward from the lower end face of the proximal portion 22 is formed on the proximal portion 22.

The cover portion 24 is formed of an outer circumferential wall portion 24a, which covers the outer circumferential surface of the commutator 16, and a circular wall portion 24b, which covers the lower end face of the commutator 16. The circular wall portion 24b is integrally formed on the lower end of the outer circumferential wall portion 24a. The circular wall portion 24b constitutes the lower end face of the cover portion 24 located on the side opposite to the yoke 11. A bearing 24c, which rotatably supports the rotary shaft 13, is provided at the center of the circular wall portion 24b. As illustrated in FIGS. 5 and 6, a pair of brush boxes 25 are formed on the lower end face of the proximal portion 22. The brush boxes 25 are arranged at an interval of 90 degrees in the circumferential direction of the proximal portion 22. Each of the brush boxes 25 extends outward in the radial direction from the outer circumferential wall portion 24a of the cover portion 24. Each of the brush boxes 25 is provided at a position 45 degrees from a lateral line L2 on the side opposite to each other in the circumferential direction in respect to the lateral line L2. The lateral line L2 is orthogonal to the axis L1 of the rotary shaft 13 and extends in the lateral direction of the motor 1.

Each of the brush boxes 25 has a rectangular box shape extending in the radial direction. Both ends of the brush box 25 are open. Each of the brush boxes 25 is formed to be hollow so that the inside and the outside of the cover portion 24 communicate with each other. A brush accommodating portion 25a is formed in each of the brush boxes 25. A feeder brush 26 having a substantially rectangular parallelepiped is contained in the brush accommodating portion 25a movably in the radial direction. A pair of the feeder brushes 26 are also arranged at positions 45 degrees from the lateral line L2 on the sides opposite to each other in the circumferential direction in respect to the Lateral line L2, similarly to the brush box 25. The feeder brushes 26 are arranged symmetrically with respect to the lateral line L2 as seen in the axial direction.

A distal end of each feeder brush 26 projects toward the inside of the outer circumferential wall portion 24a of the cover portion 24 from the brush box 25. The distal end of the feeder brush 26 is brought into contact with the segments 16a of the commutator 16. As seen in the axial direction, a proximal end 26b of the feeder brush 26 is located outside the inner circumferential surface 11d of the yoke 11. Moreover, as seen in the axial direction, an outer end 25b of the brush box 25 and an outer end 25c of the brush accommodating portion 25a are also located outside the inner circumferential surface 11d of the yoke 11. The cover portion 24 prevents drop of brush powder generated when the feeder brush 26 is chipped by sliding contact with the commutator 16.

A pair of support pillar portions 27 projecting downward from the lower end face of the proximal portion 22 are formed between the brush boxes 25. The brush boxes 25 and the support pillar portions 27 are arranged collectively on one side in the lateral direction with respect to the axis L1 of the rotary shaft 13. The brush boxes 25 are arranged symmetrically with respect to the lateral line L2, and the support pillar portions 27 are also arranged symmetrically with respect to the lateral line L2. As seen in the axial direction, a part of the support pillar portion 27 is located outside the inner circumferential surface 11d of the yoke 11.

The cross-sectional shape of the support pillar portion 27 is circular. The support pillar portion 27 has a large diameter portion 27a close to the proximal end and a support portion 27b extending downward from the large diameter portion 27a. A torsion spring 28 as an urging member is held in the periphery of the support portion 27b. The diameter of the large diameter portion 27a is larger than that of the support portion 27b. Thus, a step is formed on the boundary portion between the support portion 27b and the large diameter portion 27a. The position in the axial direction of the torsion spring 28 is determined by means of the step.

A distal end 27c of each support pillar portion 27 is formed as a flat plane orthogonal to the axis L1. A first positioning projection 27d projecting downward is formed at the center of the distal end 27c. The first positioning projection 27d has a columnar shape with a diameter smaller than that of the support pillar portion 27. The first positioning projection 27d is arranged coaxially with the support pillar portion 27. A step is formed on the boundary portion between the first positioning projection 27d and the support pillar portion 27.

One end of the torsion spring 28 is held by the outer circumferential wall portion 24a of the cover portion 24. The other end of the torsion spring 28 is brought into contact with the proximal end 26b of the feeder brush 26. The other end of the torsion spring 28 is pressed inward against the feeder brush 26. As a result, since the feeder brush 26 is urged inward, the distal end of the feeder brush 26 is pressed into contact with the segments 16a of the commutator 16 inside the cover portion 24.

A projecting pillar portion 31 is formed on the side of the cover portion 24. The projecting pillar portion 31 is arranged on the side opposite to the brush boxes 25 and the support pillar portions 27 with respect to the rotary shaft 13. The projecting pillar portion 31 projects downward from the lower end face of the proximal portion 22. As illustrated in FIG. 6, the projecting pillar portion 31 has a D-shaped cross-section. Thus, the side surface of the projecting pillar portion 31 facing the cover portion 24 is a flat surface. The projecting pillar portion 31 is juxtaposed with the rotary shaft 13 in the lateral direction. A center axis L3 of the projecting pillar portion 31 is in parallel with the axis L1 of the rotary shaft 13 and orthogonal to the lateral line L2. The support pillar portions 27 are arranged symmetrically with respect to the lateral line L2 passing both the center axis L3 and the axis L1 as seen in the axial direction. The brush boxes 25 are also arranged symmetrically with respect to the lateral line L2 as seen in the axial direction. Moreover, the feeder brushes 26 are arranged symmetrically with respect to the lateral line L2 as seen in the axial direction.

A distal end 31a of the projecting pillar portion 31 is formed as a flat plane orthogonal to the axis L1. The projecting pillar portion 31 has a second positioning projection 31b projecting downward from the center of the distal end 31a. The second positioning projection 31b is formed to have a columnar shape with a diameter smaller than that of the projecting pillar portion 31. The second positioning projection 31b is arranged coaxially with the projecting pillar portion 31. A step is formed on the boundary portion between the second positioning projection 31b and the projecting pillar portion 31.

A holding wall portion 33 constituting a part of a capacitor accommodating portion 32 is provided one on either side in the circumferential direction of the projecting pillar portion 31. The capacitor accommodating portion 32 is formed of each of the holding wall portions 33, the projecting pillar portion 31, and the cover portion 24. A capacitor 34 is assembled into the capacitor accommodating portion 32 from below. A choke coil 35 is held on the side opposite to the capacitor 34 of each of the holding wall portions 33. The axis of each of choke coils 35 is in parallel with the axis L1 of the motor portion 2. The holding wall portions 33 are arranged symmetrically with respect to the lateral line L2, and the choke coils 35 are also arranged symmetrically with respect to the lateral line L2.

First to third terminal holding portions 41 to 43 are formed in the brush holder 21. A set of the first to third terminal holding portions 41 to 43 is provided on a pair of terminals 40a and 40b arranged below the cover portion 24, respectively. The terminals 40a and 40b are arranged symmetrically with respect to the lateral line L2. The first terminal holding portions 41 are also arranged symmetrically with respect to the lateral line L2. The second terminal holding portions 42 are also arranged symmetrically with respect to the lateral line L2. Third terminal holding portions 43 are also arranged symmetrically with respect to the lateral line L2.

The first terminal holding portions 41 are arranged on both sides sandwiching the rotary shaft 13. Each of the first terminal holding portions 41 extends downward from the circular wall portion 24b of the cover portion 24, respectively. The first terminal holding portion 41 is formed to have a bifurcated shape. The first terminal holding portion 41 holds the terminals 40a and 40b. The second terminal holding portion 42 is provided on the lower end face of the proximal portion 22. The second terminal holding portion 42 is arranged between the choke coil 35 and the cover portion 24. First and second fixing recesses 42a and 42b are formed in the lower end face of the second terminal holding portion 42. The first and second fixing recesses 42a and 42b are arranged in a juxtaposed manner in the thickness direction of the motor 1. The fixing recess arranged inside in the thickness direction is hereinafter referred to as the first fixing recess 42a and the fixing recess arranged outside as the second fixing recess 42b in the first and second fixing recesses 42a and 42b. Each of the third terminal holding portions 43 is adjacent to each of the brush boxes 25 in the circumferential direction and arranged on the side opposite to the support pillar portion 27, respectively. The third terminal holding portion 43 extends downward from the lower end face of the proximal portion 22. The distal end of the third terminal holding portion 43 is formed to have a bifurcated shape so that the terminals 40a and 40b can be held similarly to the first terminal holding portion 41.

Each of the terminals 40a and 40b is formed by bending a metal piece obtained by punching a metal plate material into a predetermined shape. Each of the terminals 40a and 40b is formed to have a U-shape as seen in the axial direction. Each of the terminals 40a and 40b is arranged having a pair of distal ends directed to the lateral direction. Each of the terminals 40a and 40b is arranged on either side of the rotary shaft 13, respectively. The rotary shaft 13 is arranged between the pair of terminals 40a and 40b. A plate surface of each of the terminals 40a and 40b is in parallel with the axis L1 of the rotary shaft 13. Each of the terminals 40a and 40b is assembled to the first to third terminal holding portions 41 to 43 from below.

Each of the terminals 40a and 40b has a bent portion 50 located below the choke coil 35, a first terminal portion 51, and a second terminal portion 52. The first terminal portion 51 and the second terminal portion 52 extend straight in the lateral direction from the bent portion 50, as seen in the axial direction, respectively. Each of the terminals 40a and 40b is formed to have a U-shape as seen in the axial direction. The first and second terminal portions 51 and 52 are juxtaposed in the thickness direction. The first and second terminal portions 51 and 52 are directed to the lateral direction and in the same direction. The first and second terminal portions 51 and 52 are directed in the opposite direction to the insertion direction of a connection terminal 72a, which will be described later. The first terminal portion 51 is arranged so as to partially overlap the circular wall portion 24b and the commutator 16 as seen in the axial direction. On the other hand, the second terminal portion 52 is arranged so as not to overlap the cover portion 24 as seen in the axial direction.

As illustrated in FIG. 5, the first terminal portion 51 is formed to have the shape of a tuning fork. The distal end of the first terminal portion 51 is open toward the lateral direction as seen in the thickness direction of the motor 1. In more detail, the first terminal portion 51 has a proximal end portion 51a and first and second extended portions 51b and 51c extending in the lateral direction from the proximal end portion 51a. The first and second extended portions 51b and 51c are juxtaposed in the axial direction. A contact projection 51d is formed one each at the distal end of each of the extended portions 51b and 51c. The contact projections 51d project to approach each other.

The first and second extended portions 51b and 51c are held by the first terminal holding portion 41 in the thickness direction. The first terminal portion 51 is held by the first terminal holding portion 41 at a portion closer to the distal end than the proximal end portion 51a. An engagement projection 51e projecting toward the cover portion 24 is formed on the second extended portion 51c close to the yoke 11 in the pair of extended portions 51b and 51c. The engagement projection 51e can be brought into contact with the first terminal holding portion 41 in the lateral direction of the motor 1.

As illustrated in FIGS. 4 and 5, the first terminal portion 51 has a projection 51f at a portion corresponding to the second terminal holding portion 42. The projection 51f projects from the upper edge of the first terminal portion 51 toward the cover portion 24. The first terminal portion 51 is held by the second terminal holding portion 42 by fitting the projection 51f in the first fixing recess 42a of the second terminal holding portion 42. A projection 52a projecting from the upper edge of the second terminal portion 52 toward the cover portion 24 is also formed on the second terminal portion 52. The second terminal portion 52 is held by the second terminal holding portion 42 by fitting the projection 52a in the second fixing recess 42b of the second terminal holding portion 42. Movement of the terminals 40a and 40b in the lateral direction is regulated by fitting the projection 51f in the first fixing recess 42a and fitting the projection 52a in the second fixing recess 42b. Also, the second terminal portion 52 is held by also the third terminal holding portion 43.

As illustrated in FIG. 6, with the terminals 40a and 40b held by the brush holder 21, the end portion of the second terminal portion 52 is welded to a pig tail 26a of each feeder brush 26. As a result, the second terminal portion 52 is electrically connected to the feeder brush 26 through the pig tail 26a. A connection portion 51g is formed on the boundary portion between the first terminal portion 51 and the bent portion 50. A pair of connection end portions 34a extending from the capacitor 34 are welded to the connection portion 51g of each of the first terminal portion 51, respectively. As a result, the capacitor 34 is electrically connected to each of the first terminal portions 51, respectively. A connection end portion 35a of each of the choke coils 35 is welded to the second terminal portion 52 of each of the terminals 40a and 40b. As a result, the choke coil 35 is electrically connected to each of the second terminal portions 52, respectively. A thermistor 36 is arranged outside the second terminal portion 52 of the one terminal 40b. The thermistor 36 is electrically connected to the second terminal portion 52.

[Configuration of Speed Reducing Portion]

As illustrated in FIG. 3, the speed reducing portion 3 has a gear housing 61 and a speed reducing mechanism 62 contained in the gear housing 61. As illustrated in FIG. 7, three threaded holes 61b are formed in an end face 61a of the gear housing 61 facing the yoke 11. The end face 61a of the gear housing 61 is brought into contact with the flange portion 11b of the yoke 11. As illustrated in FIG. 6, three screw insertion holes 11c are formed in the flange portion 11b. As illustrated in FIGS. 1 to 4, the gear housing 61 is fixed to the flange portion 11b of the yoke 11 by tightening three screws 63 inserted through the screw insertion holes 11c into the threaded holes 61b.

A holder accommodating portion 64 opened upward is formed in the gear housing 61. The holder accommodating portion 64 is arranged inside the three threaded holes 61b on the end face 61a of the gear housing 61. A part of the brush holder 21, the commutator 16, and the rotary shaft 13 are contained in the holder accommodating portion 64. The holder accommodating portion 64 has a pair of opposing wall portions 64a and a pair of opposing wall portions 64b and 64c. Each of the opposing wall portions 64a is arranged opposite to each other in the thickness direction, and each of the opposing wall portions 64b and 64c is arranged opposite to each other in the lateral direction. Each of the opposing wall portions 64a has a flat surface extending in the lateral direction. Each of the opposing wall portions 64b and 64c has a curved surface swollen outward.

As illustrated in FIGS. 2, 3, and 7, a pair of projecting wall portions 65 are formed on the opposing wall portions 64b close to the connector portion 4. Each of the projecting wall portions 65 projects to the inside of the holder accommodating portion 64 in the direction orthogonal to the axis. The projecting wall portions 65 are arranged symmetrically with respect to the lateral line L2. Each of the projecting wall portions 65 has a first end face 65a and a second end face 65b orthogonal to the first end face 65a. The first end face 65a is a flat surface orthogonal to the thickness direction. An upper end face 65c of each of the projecting wall portions 65 is a flat surface orthogonal to the axis L1. The upper end faces 65c of the projecting wall portions 65 are arranged on the same plane.

The first end faces 65a face each other in the thickness direction. A first positioning recess 65d having a circular shape is formed in the upper end face 65c of each of the projecting wall portions 65. Each of the first positioning projections 27d of the brush holder 21 is fitted in each of the positioning recesses 65d. Moreover, a projecting portion 66 projecting inward is formed at the center of the opposing wall portion 64c located on the side opposite to the projecting wall portion 65. The upper end face 66a of the projecting portion 66 is arranged on the same plane as the upper end face 65c of each of the projecting wall portions 65. A second positioning recess 66b having a circular shape is formed in the upper end face 66a. The second positioning projection 31b of the brush holder 21 is fitted in the positioning recess portion 66b. The position of the gear housing 61 with respect to the brush holder 21 is determined by fitting each of the first positioning projections 27d in each of the first positioning recess portions 65d, respectively, and by fitting the second positioning projection 31b in the second positioning recess portion 66b.

As illustrated in FIG. 7, a reference surface 65e is formed on the upper end face 65c of each of the projecting wall portions 65. The reference surface 65e is formed by raising the periphery of the first positioning recess 65d. Also, a reference surface 66c is formed on the upper end face 66a of the projecting portion 66. The reference surface 66c is also formed by raising the periphery of the second positioning recess 66b. The reference surfaces 65e and 66c are arranged on the same plane orthogonal to the axis L1. Each of the reference surfaces 65e is brought into contact with the distal end 27c of each support pillar portion 27, while the reference surface 66c is brought into contact with the distal end 31a of the projecting pillar portion 31. As a result, the position in the axial direction of the brush holder 21 is determined. Since a projecting amount in the axial direction of each of the reference surfaces 65e and 66c is slight, it is omitted from FIGS. 2 and 3. Each of the reference surfaces 65e and 66c is locally formed on each of the upper end faces of each of the projecting wall portions 65 and the projecting portion 66. Thus, inspection of the positions in the axial direction and flatness of each of the reference surfaces 65e and 66c is easy, and adjustment to form the reference surfaces 65e and 66c on the same plane is also easy.

As illustrated in FIGS. 2, 3, and 7, the gear housing 61 has a connector mounting portion 67 on the side opposite to a wheel accommodating portion 61e. The connector portion 4 is detachably attached to the connector mounting portion 67 from the lateral direction. An inlet port 68 opened toward the wheel accommodating portion 61e is formed in the connector mounting portion 67. The wall portion of the inlet port 68 facing the motor portion 2 is formed of the projecting wall portions 65. The inlet port 68 communicates with the holder accommodating portion 64 in the gear housing 61. The holder accommodating portion 64 communicates with the outside of the gear housing 61 via the inlet port 68. The inlet port 68 has a rectangular-shaped cross-section.

As illustrated in FIGS. 2 to 4, the connector portion 4 has a fixing portion 71, a control IC 72, and an external connection portion 73. The fixing portion 71 is fixed to the connector mounting portion 67, and the control IC 72 is inserted into the inlet port 68. An external connector (not shown) for input/output of an electric signal and power feeding is connected to the external connection portion 73. The fixing portion 71 has a pair of engagement pieces 71a. Also, a pair of engagement projections 67a are formed on both ends of the connector mounting portion 67. The connector portion 4 is fixed to the connector mounting portion 67 by engaging the engagement pieces 71a with the engagement projections 67a. A gap between the connector mounting portion 67 and the fixing portion 71 is sealed for water proof.

The control IC 72 having a rectangular parallelepiped extending in the lateral direction is provided on the fixing portion 71. Flat-plate shaped connection terminals 72a projecting in the lateral direction are provided at the distal end of the control IC 72. The connection terminals 72a are juxtaposed in the thickness direction. The control IC 72 is inserted into the inlet port 68 of the connector mounting portion 67. The connection terminals 72a are pressed between the first and second extended portions 51b and 51c of the first terminal portion 51 of the terminals 40a and 40b while being inserted into the holder accommodating portion 64. As a result, the connection terminals 72a are held by the contact projections 51d of the first and second extended portions 51b and 51c and electrically connected to the terminals 40a and 40b. As illustrated in FIG. 3, an opening 73a is formed in the external connection portion 73 of the connector portion 4. An external connection terminal 73b is provided at the opening 73a. The external connection terminal 73b is electrically connected to the control IC 72. The external connection terminal 73b is electrically connected to an external connector to be attached to the external connection portion 73.

As illustrated in FIG. 7, a ventilation hole 81 is formed in the gear housing 61. The ventilation hole 81 is formed in a lower wall portion 68a of an inlet port 68. The ventilation hole 81 communicates with the outside through an internal opening 81a. The internal opening 81a is overlapped with a gap G between the pair of projecting wall portions 65 as seen in the axial direction. Thus, when the gear housing 61 is molded, a slide die for molding the internal opening 81a can be pulled out in the axial direction through the gap G between the projecting wall portions 65. Moreover, the dimension of the gear housing 61 in the direction orthogonal to the axis is also reduced.

The ventilation hole 81 is provided in order to cancel air pressure difference between inside and outside the gear housing 61. Thus, the ventilation hole 81 suppresses stress concentration to a sealing member S or the like, which seals the gear housing 61. Moreover, a water-proof sheet, which prevents water from intruding into the gear housing 61, is provided in the ventilation hole 81. The gear housing 61 has a communication hole 64d penetrating in the axial direction one on either side of the projecting portion 66. The holder accommodating portion 64 communicates with the wheel accommodating portion 61e through a communication hole 64d.

As illustrated in FIGS. 2 and 3, a clutch accommodating portion 61c is adjoined from below the holder accommodating portion 64, and a worm accommodating portion 61d is adjoined from further below the clutch accommodating portion 61c. The holder accommodating portion 64, the clutch accommodating portion 61c, and the worm accommodating portion 61d communicate with each other. The worm accommodating portion 61d supports a worm shaft 82 rotatably around the axis L1. The clutch accommodating portion 61c accommodates a clutch 83. The worm shaft 82 is connected to the rotary shaft 13 of the motor portion 2 through the clutch 83. The clutch 83 is configured to transmit a rotating force of the rotary shaft 13 to the worm shaft 82 and to regulate the rotation of the clutch 83 itself by input of the rotating force from the worm shaft 82. A connection portion between the clutch 83 and the rotary shaft 13 is arranged between each of the terminals 40a and 40b attached to the brush holder 21. As a result, the dimension in the axial direction of the motor 1 is reduced.

The wheel accommodating portion 61e is formed on the side of the worm accommodating portion 61d. The wheel accommodating portion 61e communicates with the worm accommodating portion 61d. The wheel accommodating portion 61e accommodates a disk-shaped worm wheel 84 to be meshed with the worm shaft 82. The worm wheel 84 is supported rotatably around an axis in parallel with the thickness direction. The worm shaft 82 and the worm wheel 84 constitute the speed reducing mechanism 62. The speed of rotation of the rotary shaft 13 is reduced by the worm shaft 82 and the worm wheel 84 and then, the rotation is outputted from an output shaft 85 rotating together with the worm wheel 84. The output shaft 85 projects to the outside of the gear housing 61 and is connected to a window glass through a window regulator.

Subsequently, operation of the motor 1 will be described.

An external connector is attached to the connector portion 4. Power supplied from the external connector is supplied to the terminals 40a, 40b and the feeder brushes 26 through the connection terminal 72a of the control IC 72. Then, the power is supplied to the segments 16a of the commutator 16 and the coil 35 in this order through each of the feeder brushes 26. As a result, the armature 14 rotates together with the rotary shaft 13. The rotation of the rotary shaft 13 is transmitted to the worm shaft 82 through the clutch 83. The speed of rotation of the rotary shaft 13 is reduced in the worm shaft 82 and the worm wheel 84 and is outputted by the output shaft 85. The rotation of the output shaft 85 is outputted to the window glass through the window regulator. The window glass is raised or lowered in accordance with the rotating direction of the output shaft 85.

According to this embodiment, the commutator 16 and the feeder brushes 26 are arranged outside the yoke 11. Thus, if the outer diameter of the commutator 16 is increased for higher output of the motor 1, the yoke 11 made of metal does not have to be made into a stepped shape. Thus, the yoke 11 can be formed to have a simple cylindrical shape without a step, for example. Also, the proximal ends 26*b* of the feeder brushes 26 project to the outside of the inner circumferential surface 11*d* of the yoke 11. Thus, the dimension of the feeder brush 26 can be increased as compared with the configuration in which the commutator 16 and the feeder brush 26 are arranged inside the yoke 11. As described above, according to the present invention, the yoke 11 can be made having a simple shape, and manufacture is facilitated. Also, the multipolar commutator 16 can be realized while the dimension of the feeder brush 26 is maintained long, and the outer diameter of the commutator 16 can be increased.

The brush boxes 25 and the support pillar portions 27 are collected and arranged on one side in the lateral direction with respect to the axis L1 of the rotary shaft 13. The brush boxes 25 are arranged symmetrically with respect to the lateral line L2, and the support pillar portions 27 are also arranged symmetrically with respect to the lateral line L2. Such arrangement is suitable for reduction of the dimension of the brush holder 21 in the direction orthogonal to the axis.

If the motor 1 is used not as the power window device but as a drive source for a vehicle wiper device, another brush accommodating portion and another feeder brush may be added on the side opposite to the brush box 25 with respect to the axis L1, that is, in the vicinity of the capacitor accommodating portion 32. In another words, a design change involved in addition of feeder brushes 26 can be made easily in the configuration in which two feeder brushes 26 are provided at an interval of 90 degrees in the circumferential direction as in this embodiment.

The terminals 40*a* and 40*b* are arranged on the side opposite to the yoke 11 with respect to the commutator 16 and arranged so that a part of each of the terminals 40*a* and 40*b* is overlapped with the commutator 16 as seen in the axial direction. As a result, the dimension of the motor 1 in the direction orthogonal to the axis is reduced. Also, each of the terminals 40*a* and 40*b* is formed of the first and second terminal portions 51 and 52 directed to the same direction in the direction orthogonal to the axis and the bent portion 50 connecting them. As a result, the connection terminal 72*a* of the connector portion 4 and the feeder brush 26 can be arranged in the vicinity of the first and second terminal portions 51 and 52 of each of the terminals 40*a* and 40*b*, and electrical components such as the capacitor 34 and the choke coil 35 to be connected to each of the terminals 40*a* and 40*b* can be arranged in the vicinity of the connection portion 51*g* between the terminals 40*a* and 40*b*. As a result, all of the feeder brush 26, the capacitor 34, the choke coil 35, and the connection terminal 72*a* of the connector portion 4 do not have to be arranged along the direction orthogonal to the axis, and the dimension of the motor 1 in the direction orthogonal to the axis can be reduced.

When the motor portion 2 is assembled to the gear housing 61 in the motor 1, each of the first positioning projections 27*d* is fitted in each of the first positioning recesses 65*d*, and the second positioning projection 31*b* is fitted in the second positioning recess 66*b*. As a result, the position of the gear housing 61 with respect to the brush holder 21 is determined. Also, the projecting wall portion 65 receives brush powder dropped from the brush holder 21.

The reference surface 65*e* of each of the projecting wall portions 65 is brought into contact with the distal end 27*c* of each of the support pillar portions 27, and the reference surface 66*c* of the projecting portion 66 is brought into contact with the distal end 31*a* of the projecting pillar portion 31. As a result, the position of the brush holder 21 in the axial direction is determined, and the movement of the brush holder 21 in the axial direction is regulated. Thus, the brush holder 21 is stably supported with respect to the gear housing 61. Here, the first positioning projection 27*d* is provided at the distal end 27*c* of the support pillar portion 27. In this case, there is no need to increase the dimension of the brush holder 21 in the direction orthogonal to the axis in order to ensure the space of the positioning projection 27*d*.

Moreover, the control IC 72 of the connector portion 4 is inserted into the inlet port 68 of the gear housing 61. The first positioning recess 65*d* is formed on the upper end face 65*c* of the projecting wall portion 65 constituting the inlet port 68. As a result, the position of the gear housing 61 to the brush holder 21 in the direction orthogonal to the axis is fixed at a position closer to the motor portion 2 than the control IC 72 inserted into the inlet port 68. Thus, the first positioning projection 27*d* of the brush holder 21 does not interfere with the control IC 72.

Subsequently, characteristic advantages of this embodiment will be described.

(1) The commutator 16 and the feeder brush 26 are arranged outside the yoke 11 as seen in the direction orthogonal to the axis of the yoke 11. As seen in the axial direction, the proximal end 26*b* of the feeder brush 26 is arranged outside the inner circumferential surface 11*d* of the yoke 11. As a result, if the outer diameter of the commutator 16 is increased for higher output of the motor 1, the yoke 11 made of metal does not have to be made into a stepped shape. Thus, the yoke 11 can be manufactured easily. Also, the dimension of the feeder brush 26 can be increased. Thus, the life of the product can be prolonged.

(2) The support pillar portion 27 projecting toward the gear housing 61 and the torsion spring 28 supported by the support pillar portion 27 are provided in the brush holder 21. The torsion spring 28 presses the feeder brush 26 against the commutator 16. As seen in the axial direction, a part of the support pillar portion 27 is arranged outside the inner circumferential surface 11*d* of the yoke 11. By means of such arrangement, the outer diameter of the commutator 16 can be increased, and higher output of the motor 1 is realized.

(3) The feeder brushes 26 are arranged symmetrically with respect to the lateral line L2 orthogonal to the axis L1 of the motor portion 2 as seen in the axial direction. The pair of support pillar portions 27 are arranged between the pair of feeder brushes 26. By such arrangement, the dimension of the brush holder 21 in the direction orthogonal to the axis can be reduced and consequently reduce the dimension of the motor 1 in the direction orthogonal to the axis.

(4) The commutator 16, the feeder brushes 26, and the brush accommodating portions 25*a* are all arranged outside the yoke 11 as seen in the direction orthogonal to the axis of the yoke 11. As seen in the axial direction, the outer end 25*c* of the brush accommodating portion 25*a* is also arranged outside the inner circumferential surface 11*d* of the yoke 11. As a result, the feeder brushes 26 can be held so that the proximal ends 26*b* of the feeder brushes 26 are arranged outside the inner circumferential surface 11*d* of the yoke 11 as seen in the axial direction.

(5) The brush boxes 25, each including the commutator 16, the feeder brush 26, and the brush accommodating portion 25a, are arranged outside the yoke 11 as seen in the direction orthogonal to the axis of the yoke 11. As seen in the axial direction, the outer end 25b of the brush box 25 is arranged outside the inner circumferential surface 11d of the yoke 11. As a result, the outer end 25c of the brush accommodating portion 25a can be arranged outside the inner circumferential surface 11d of the yoke 11 as viewed in the axial direction.

This embodiment may be modified as follows.

In the above-described embodiment, the feeder brushes 26 are arranged at an interval of 90 degrees in the circumferential direction. However, the brushes 26 may be arranged at an interval of 180 degrees.

In the above-described embodiment, a part of the support pillar portion 27 is arranged outside the inner circumferential surface 11d of the yoke 11 as viewed in the axial direction. However, the entire support pillar portion 27 may be arranged outside the inner circumferential surface 11d of the yoke 11.

In the above-described embodiment, a part of the feeder brush 26 is arranged outside the inner circumferential surface 11d of the yoke 11 as seen in the axial direction. However, the entire feeder brush 26 may be arranged outside the inner circumferential surface 11d of the yoke 11.

In the above-described embodiment, the number of the feeder brushes 26 may be 3 or more.

In the above-described embodiment, the configuration of the insertion portion inserted into the inlet port 68 in the connector portion 4 may be changed as appropriate. Also, the control IC 72 may be deleted from the connector portion 4. In this case, the connector portion may be provided with a connection terminal to be connected to the terminals 40a and 40b.

In the above-described embodiment, the torsion spring 28 is used as the urging member which presses the feeder brush 26, but a spring other than the torsion spring may be used.

In the above-described embodiment, the speed reducing mechanism 62 is composed of the worm shaft 82 and the worm wheel 84, but it may be composed of a spur gear or the like.

In the above-described embodiment, the present invention is applied to a drive source for a power window device but may be applied to a drive source for a device other than the power window device.

The invention claimed is:

1. A motor comprising:
a motor portion; and
a speed reducing portion,
wherein the motor portion includes a brush holder, which holds a feeder brush for supplying power to a commutator fixed to a rotary shaft, the brush holder being provided at an open end of a metal yoke housing, through which open end rotation of the motor portion is outputted,
wherein a gear housing is assembled to the open end of the yoke housing,
wherein the speed reducing portion has a speed reducing mechanism located in the gear housing, the speed reducing mechanism reducing the speed of the rotation from the motor portion and outputting the rotation,
wherein as seen in a direction orthogonal to an axis of the yoke housing, the commutator and the feeder brush are arranged outside the yoke housing, and
wherein as seen in the axial direction, an outer end of the feeder brush is arranged outside an inner circumferential surface of the yoke housing,
wherein the brush holder includes:
a cover portion formed of an outer circumferential wall portion and a circular wall portion, the outer circumferential wall portion extending in the axial direction and covering an outer circumferential surface of the commutator, the circular wall portion being formed on an axial end of the outer circumferential wall portion and covering an axial end face of the commutator; and
a brush box accommodating the feeder brush, the brush box extending outward in a radial direction from the outer circumferential wall portion of the cover portion,
wherein, as seen in the axial direction, a radial direction outer end of the brush box is arranged outside the inner circumferential surface of the open end of the yoke housing.

2. The motor according to claim 1,
wherein the brush holder has a brush accommodating portion, which accommodates the feeder brush such that the feeder brush is movable, and
wherein as seen in the axial direction, an outer end of the brush accommodating portion is arranged outside the inner circumferential surface of the yoke housing.

3. The motor according to claim 1,
wherein a support pillar portion, which projects toward the gear housing, and an urging member supported by the support pillar portion are provided in the brush holder, the urging member pressing the feeder brush against the commutator, and
wherein as seen in the axial direction, at least a part of the support pillar portion is arranged outside the inner circumferential surface of the yoke housing.

4. The motor according to claim 3,
wherein the feeder brush is one of a pair of feeder brushes,
wherein as seen in the axial direction, the feeder brushes are arranged symmetrically with respect to a straight line orthogonal to an axis of the motor portion, and
wherein the support pillar portion is arranged between the feeder brushes in the circumferential direction of the feeder brushes.

5. A motor comprising:
a motor portion; and
a speed reducing portion,
wherein the motor portion includes a brush holder, which holds a feeder brush for supplying power to a commutator fixed to a rotary shaft, the brush holder being provided at an open end of a metal yoke housing, through which open end rotation of the motor portion is outputted,
wherein a gear housing is assembled to the open end of the yoke housing,
wherein the speed reducing portion has a speed reducing mechanism located in the gear housing, the speed reducing mechanism reducing the speed of the rotation from the motor portion and outputting the rotation,
wherein the brush holder includes:
a cover portion formed of an outer circumferential wall portion and a circular wall portion, the outer circumferential wall portion extending in the axial direction and covering an outer circumferential surface of the commutator, the circular wall portion being formed on an axial end of the outer circumferential wall portion and covering an axial end face of the commutator; and a brush box accommodating the feeder brush, the brush box extending outward in a radial direction from the outer circumferential wall portion of the cover portion, wherein, as seen in a direction orthogonal to an axis of the yoke housing, the commutator, the brush box, and the feeder brush are arranged outside the yoke housing, and wherein, as seen in the axial direction, a radial direction outer end of the brush box is arranged outside an inner circumferential surface of the open end of the yoke housing.

6. A The motor according to claim 5, wherein the brush holder has a brush accommodating portion, which accommodates the feeder brush such that the feeder brush is movable, wherein, as seen in a direction orthogonal to an axis of the yoke housing, the brush accommodating portion is arranged outside the yoke housing, and wherein, as seen in the axial direction, an outer end of the brush accommodating portion is arranged outside an inner circumferential surface of the yoke housing.

* * * * *